F. W. HILL & G. E. WILLIAMS.
ELECTRICAL SPEED TRANSMISSION.
APPLICATION FILED MAR. 14, 1916.

1,260,195.

Patented Mar. 19, 1918.
2 SHEETS—SHEET 2.

Inventor
F. W. Hill
G. E. Williams

By
[signature] Attorneys.

UNITED STATES PATENT OFFICE.

FELIX W. HILL AND GUY E. WILLIAMS, OF PROCTOR, MINNESOTA.

ELECTRICAL SPEED TRANSMISSION.

1,260,195.

Specification of Letters Patent. Patented Mar. 19, 1918.

Application filed March 14, 1916. Serial No. 84,124.

*To all whom it may concern:*

Be it known that we, FELIX W. HILL and GUY E. WILLIAMS, citizens of the United States, residing at Proctor, in the county of St. Louis and State of Minnesota, have invented certain new and useful Improvements in Electrical Speed Transmissions, of which the following is a specification.

Our invention relates to new and useful improvements in variable speed transmission mechanisms, the primary object of our invention being the provision of a transmission mechanism which is electrically controlled and which operates by magnetism in such a manner that there need be absolutely no mechanical connection between the driving and driven members so that there need be no shocks or strains imparted from one to the other because of changes in power application or load.

A still further object of our invention consists in providing a transmission machanism of the above described character which is particularly desirable for self-propelled vehicles of the types in which the power is derived from internal combustion or steam engines.

By providing an electrically controlled magnetic transmission mechanism we accomplish a still further object, namely, the provision of a mechanism of extreme flexibility in which the power may be transmitted from an engine to the rear axle of a vehicle to drive the vehicle at any desired speed, within the capacity of the motor, either ahead or in reverse direction.

With these and other objects in view, our invention will be more fully described, illustrated in the accompanying drawings, and then specifically pointed out in the claims which are attached to and form a part of this application.

In the drawings.

Corresponding and like parts are referred to in the following description and indicated in all the views of the drawings by the same reference characters.

Broadly speaking our invention depends upon the principle that the rotating of the field winding of an induction motor of the single phase type, while such winding is receiving direct current, will cause it to exert a magnetic attraction upon the core or armature of the motor which will therefore tend to rotate with the field winding. It will, therefore, be clear that an electrical motor of this type constitutes the most vital element of our invention.

Figure 1:
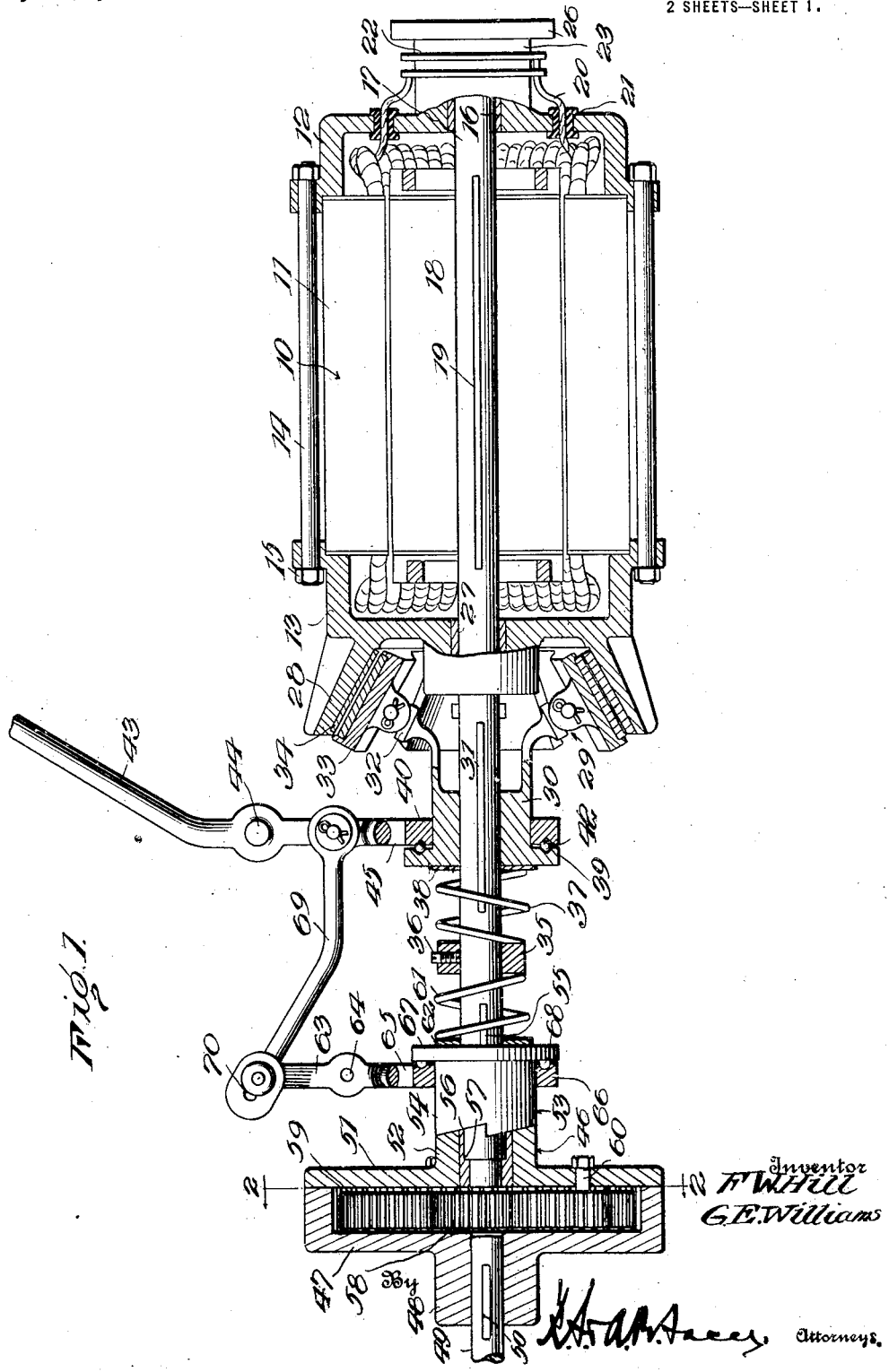
Figure 1 is a central longitudinal sectional view taken through our improved electrical transmission mechanism.
Figure 2:
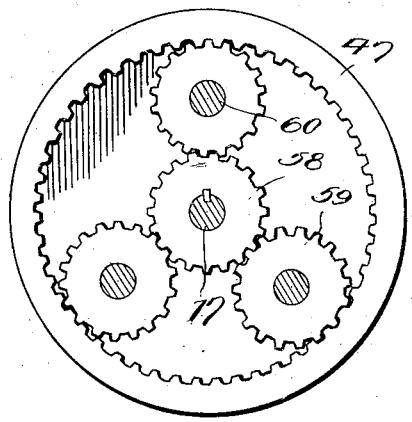
Fig. 2 is a sectional view on the line 2—2 of Fig. 1 showing certain details in a planetary reverse gear mechanism.
Figure 3:
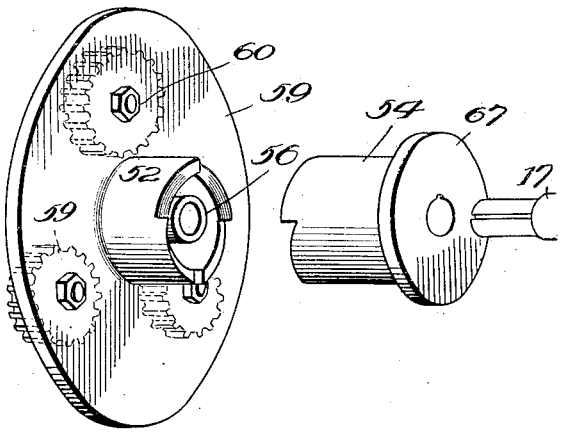
Fig. 3 is an unassembled perspective view of a portion of the planetary reverse gear mechanism including its clutch.

Referring more particularly to Fig. 1, we have illustrated a motor, indicated as a whole by the numeral 10. This motor is an induction motor of the single phase hand started squirrel cage type. This motor is of conventional structure with the exception that as its frame or field is to rotate, as well as its armature, such frame is not formed with feet, as is customary and with the further exception that to economize in space, the motor is preferably made somewhat longer than usual and correspondingly smaller in diameter. The field or stator core 11 is built up of laminations and slotted for the field winding in the usual manner and is clamped between two end bearing frames 12 and 13 by means of the tie bolts 14 and nuts 15. These bearing members are provided with journals 16 to rotatably receive the shaft 17 of the rotor 18 which is of the standard squirrel cage type made up with heavy copper bars and short circuit rings welded, riveted, cast, soldered, screwed or otherwise secured to the ends. The rotor 18 is keyed to its shaft 17, as shown at 19. As both the stator and rotor are to revolve, the terminals of the stator winding 20 are brought through insulated bushings 21 in the bearing frame 12 and connected to contact rings 22 located upon a cylindrical neck portion 23 extending from the bearing frame 12. These contact rings 22 are insulated from the bearing frame by rings of insulative material 24 and are adapted to be engaged by contact brushes 25 through which current may be supplied to and led from the field winding. The bearing frame 12 is formed with a collar 26 by means of which it may be directly connected to the drive shaft of the engine or equivalent source of power.

The bearing frame 13 is also provided with a journal 27 for the shaft 17 and is preferably formed with a rearwardly directed frusto-conical flange 28 forming the outer member of a clutch, indicated as a whole by the numeral 29. This clutch includes a sleeve 30 secured to the shaft 17 by a key 31 and having arms 32 carrying a frusto-conical clutch ring 33 divided into sections, one for each arm, to allow for contraction when the clutch engages. The clutch flange 28 and clutch ring 33 have their abutting faces grooved to receive clutch bands 34 so that when the collar 30 or sleeve is moved in one direction, the clutch bands will be brought into engagement with each other to lock the shaft 17 to the bearing frame 13 and, consequently, to the stator. A collar 35 is fixed against longitudinal movement upon the shaft 17 by a set screw 36 or equivalent means and a helical spring 37 bears between this collar and a wear plate 38 which engages the end of the sleeve 30 to normally tend to force the clutch members into engagement with each other. The clutch sleeve 30 is formed at its free end with an annular encircling flange 39 and the sleeve is further surrounded by a collar 40, the inner faces of the flange and collar being channeled to form a race for ball bearings 42. A hand lever 43 is pivoted to any suitable support, as shown at 44, and at its free end is bifurcated to provide fork arms 45 which have operative connection with the collar 40 so that forward swinging of the hand lever will force the clutch members out of engagement with each other and hold them against the action of the spring 37.

The above described structure constitutes a transmission complete in itself as far as its ability to transmit power in a single direction, is concerned. Inasmuch as it is essential that motor vehicles be capable of backward movement, we provide a reversing mechanism, indicated as a whole by the numeral 46. This mechanism includes an internal spur gear 47 having a hub portion 48 which is secured upon the drive shaft 49 leading from the transmission to the rear axle by a key 50 or other suitable means. A face plate 51 forms a closure for the internal gear and is provided with a hub 52 which constitutes one member of a dog toothed clutch 53, the other member 54 of which is in the form of a sleeve secured to the shaft 17 by a key 55. That end of the shaft 17 projecting into the hub 52 is journaled in a bearing 56 located in the hub and is reduced to provide a stop shoulder 57 engaging a shoulder formed in the bearing. The reduced end of the shaft 17 carries a spur gear 58 which is keyed to the shaft and which meshes, at all times, with idly mounted spur gears 59 all of which mesh with the internal gear 47. These spur gears 59 are idly mounted upon stub shafts 60 carried by the face plate 51. A spring 61 engaging between the collar 35 and a wear plate 62 engaging against the end of the clutch sleeve 54 normally holds the members of the clutch 53 in locking engagement with each other. A shipper lever 63 is pivoted intermediate its length, as shown at 64, and has one end bifurcated to provide arms 65 which operatively engage a collar 66 loosely mounted upon the clutch sleeve 54 and engaging a flange 67 formed upon the clutch sleeve, the collar and flange being grooved to provide a race for ball bearings 68. A link 69 is pivoted at one end to the lever 43 between its point of pivotal support and its forked terminal and at its other end is slotted, as shown at 70, for pivotal connection with the free end of the shipper lever 63. Because of this arrangement, it will be clear that movement of the hand lever 43 in a forward direction from the position shown in Fig. 1 will throw the clutch members 52 and 54 out of engagement with each other, while slight movement of the hand lever in the reverse direction, while leaving the clutch 53 in active position, will move the clutch 29 into active position.

Figure 5:
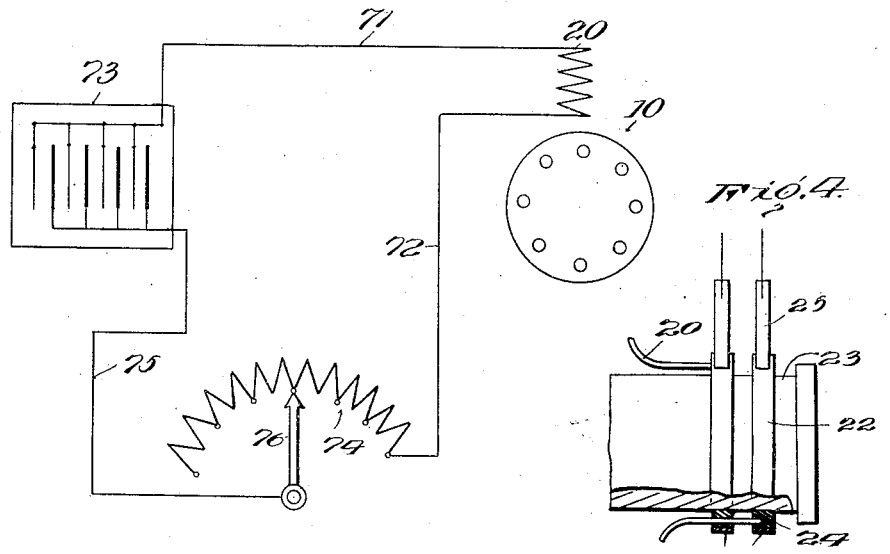
Fig. 5 is a diagrammatic view of the wiring system employed.
Figure 4:
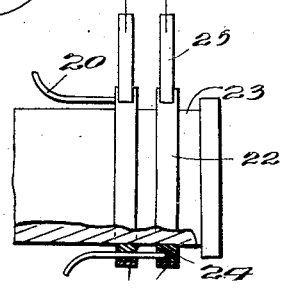
Fig. 4 is an elevation, partially in section, of the contact rings of a motor forming the principal unit of our transmission mechanism.

In Fig. 5, we have illustrated diagrammatically the form of wiring system which may be employed in controlling the above described transmission mechanism. As there shown, the field winding 20 of the motor 10 is connected by one terminal to a wire 71 and by its other terminal to a wire 72, this connection, of course, being through the contact rings 22 and brushes 25, which are not shown in this figure. The wire 71 leads to one pole of a storage battery 73 and the wire 72 to one of the terminal contacts of a rheostat 74, while a wire 75 leads from the swinging member 76 of the rheostat to the other pole of the battery.

In describing the operation of our improved transmission mechanism, we will assume that the transmission mechanism proper is in the position shown in Fig. 1, in which the members of the clutch 29 are out of engagement with each other and the members of the clutch 53 are in engagement with each other, this being what may be well termed the normal running position of the transmission. We will also assume that the movable member of the rheostat 74 is in such a position as to break the circuit through the field winding 20 of the stator of the motor. With the parts in this position, the internal combustion engine or other engine of the vehicle is started in the usual manner and the rotation of its crank shaft transmitted directly to the stator 11 rotating it and its clutch member 28, but having no effect whatever upon the shaft 17 or clutch member 33. Because of this, it will be apparent that no power will be transmitted to the shaft 17 and, consequently, to the shaft 49 and rear axle of the vehicle.

When the driver is ready to start the vehicle, he will swing the movable member of the rheostat to such a position as to permit the passage of a weak current from the battery through the field winding of the motor and back to the battery, that is, to such a position that all or substantially all of the resistance of the rheostat is interposed in the circuit. This energization of the field winding of the motor, while the stator thereof is rotating, sets up a magnetic field which tends to cause the rotor to turn with the stator. As a result, power is transmitted to the shaft 17 and as this shaft is locked, both to the face plate 51 and pinion 58, power will be transmitted directly from the shaft 17 to the shaft 49. The rate of transmission of the power or the ratio of turning movement between the stator and rotor, which is of course the same as the ratio between the crank shaft of the engine and the shaft 49, is dependent upon the strength of current passing through the field winding of the motor. It will, therefore, be clear that the speed of the vehicle may be increased by increasing the strength of current supplied to the field winding 20 which may be accomplished by cutting out resistance in the rheostat 74, the speed of the rotor gradually approaching that of the stator as the strength of current increases until, if the resistance to motion is not too great, the rotor will have acquired a speed about five per cent. below that of the stator which gives a vehicle speed substantially the same as that ordinarily attained by a direct drive between the engine and rear axle.

As will be readily apparent, there is no direct mechanical connection between the engine proper of the vehicle and the shaft 49 so that any rapid changes in engine speed, due to possible misfiring or the like, will not be imposed upon the differential mechanism and driving wheels of the vehicle and any sudden load imposed upon the shaft 49, by road conditions, will not be transmitted to the engine. As a result, an exceptionally easy and smooth transmission of power is obtained and the greater portion of the usual wear and tear upon the vehicle, differential and transmission mechanisms is avoided.

The rheostat may be readily controlled by a small lever mounted upon the steering column or wheel of the vehicle or at any other convenient point and the lever 43 may be so arranged as to be operable either by hand or foot or by both. After the vehicle has attained the highest speed possible by the electric transmission, the vehicle may be driven under direct drive by merely swinging the lever 43 rearwardly a sufficient distance to bring the members of the clutch 29 into engagement with each other. Under these conditions, there will be direct mechanical connection between the crank shaft of the engine and the shaft 49. With this clutch 29 in engagement, it is obvious that there is no longer any necessity for supplying current to the field winding of the motor and it is for this reason that we provide what may be termed the direct speed clutch 29.

If it becomes necessary to reverse the direction of movement of the vehicle, the lever 43 is swung forwardly to such an extent as to bring the members of the clutch 53 out of engagement with each other when the motion of the shaft 17 will be transmitted from the pinion 58 through the idler pinions 59 to the internal gear 47 to rotate the shaft 49 in the opposite direction.

From the foregoing description, it will be apparent that we have provided a variable speed transmission mechanism which may be installed on practically any motor vehicle with slight alterations and in which no clutch is necessary although a direct speed drive clutch may be supplied, if desired. It will further be clear that although we have described this transmission mechanism as applied to a motor vehicle it may be utilized for any purpose in which one rotating member is to be driven at variable speeds from another rotating member and that when so employed the direct speed clutch may or may not be provided. We therefore reserve the right to make any changes, within the scope of the appended claims, without in the slightest degree departing from the spirit of our invention.

Having thus described the invention, what is claimed as new is:

1. In a variable speed transmission, a rotatably mounted stator adapted to be driven by an engine, means for energizing the field windings of the stator, a pair of alined shaft sections, a reverse gear mechanism connecting the sections, a rotor fixed to one of the sections and mounted within the stator, a clutch connection between one of the sections of the shaft and the stator, an actuating lever for the reversing mechanism, and means movable to release the clutch and movable further in the same direction to operate the reverse mechanism controlling lever.

2. In a variable speed transmission, a rotatably mounted stator adapted to be driven by an engine, means for energizing the field windings of the stator, a pair of drive shaft sections, a reverse gear mechanism connecting the sections, a rotor fixed to one of the sections and mounted within the stator, a clutch connection between one of the sections of the shaft and the stator, and a single means for controlling both the clutch connection and the reverse gear mechanism whereby the reverse gear mechanism can be rendered active only after the clutch connection has been rendered inactive.

3. In a variable speed transmission, a rotatably mounted stator adapted to be driven by an engine, means for energizing the field windings of the stator, a pair of drive shaft sections, a reverse gear mechanism connecting the sections, a rotor fixed to one of the sections and mounted within the stator, a clutch connection between one of the sections of the shaft and the stator, and a single means for controlling both the clutch connection and the reverse gear mechanism whereby the reverse gear mechanism can be rendered active only after the clutch connection has been rendered inactive, said means including a manually operable clutch controlling lever, a reverse gear mechanism controlling lever, and operative connection between the levers.

In testimony whereof we affix our signatures.

FELIX W. HILL. [L. S.]
GUY E. WILLIAMS. [L. S.]

Copies of this patent may be obtained for five cents each, by addressing the "Commissioner of Patents, Washington, D. C."